United States Patent [19]

Shiraishi et al.

[11] Patent Number: 4,777,597

[45] Date of Patent: Oct. 11, 1988

[54] SIGNAL PROCESSING METHOD IN AUTORADIOGRAPHY

[75] Inventors: Hisashi Shiraishi, Minami-ashigara; Tsutomu Kimura; Kazuhiro Hishinuma, both of Kaisei, all of Japan

[73] Assignee: Fuji Photo Film Co., Ltd., Japan

[21] Appl. No.: 24,909

[22] Filed: Mar. 11, 1987

Related U.S. Application Data

[63] Continuation of Ser. No. 865,956, May 19, 1986, abandoned, which is a continuation of Ser. No. 568,877, Jan. 6, 1984, abandoned.

[30] Foreign Application Priority Data

Jan. 8, 1983 [JP]  Japan ................................. 58-1326
Jan. 8, 1983 [JP]  Japan ................................. 58-1327

[51] Int. Cl.$^4$ ................... G01N 33/58; H04N 1/40; C12Q 1/68
[52] U.S. Cl. ................... 364/413.01; 382/6; 435/6; 935/77
[58] Field of Search ............... 364/413, 414; 382/6; 435/76, 6, 77, 808; 935/77; 436/167

[56] References Cited

U.S. PATENT DOCUMENTS

| | | | |
|---|---|---|---|
| Re. 31,847 | 3/1985 | Lueluy | 250/327 |
| 4,239,968 | 12/1980 | Kotera et al. | 250/327.60 |
| 4,315,179 | 2/1982 | Kato et al. | 364/414 X |
| 4,317,318 | 2/1982 | Kato et al. | 364/414 X |
| 4,320,415 | 3/1982 | Jones | 382/6 X |
| 4,496,973 | 1/1985 | Horikawa et al. | 364/414 X |
| 4,526,865 | 7/1985 | Silman | 435/803 |

FOREIGN PATENT DOCUMENTS

0738602  6/1980  U.S.S.R. ........................ 364/413

*Primary Examiner*—Jerry Smith
*Assistant Examiner*—Charles B. Meyer
*Attorney, Agent, or Firm*—Gerald J. Ferguson, Jr.

[57] ABSTRACT

A signal processing method in autoradiography employing a stimulable phosphor sheet for the purpose of obtaining information on the one dimensional location of radioactively labeled substances distributed in at least one dimensional direction on a support medium, in the form of a symbol, numeral or combination thereof, including the steps of:
  (1) determining a one dimensional scanning line for signal processing; and
  (2) detecting sampling points on said scanning line,
the process being applied to digital signals corresponding to an autoradiograph having the locational information on the radioactively labeled substances, the digital signals being obtained from stimulable phosphor sheet.

22 Claims, 4 Drawing Sheets

POSITION

SIGNAL PROCESSING METHOD IN AUTORADIOGRAPHY

This application is a continuation of application Ser. No. 865,956, filed May 19, 1986, abandoned, which is a continuation of application Ser. No. 568,877, filed Jan. 6, 1984, abandoned.

BACKGROUND OF THE INVENTION

1. FIELD OF THE INVENTION

This invention relates to a signal processing method in autoradiography.

2. DESCRIPTION OF THE PRIOR ART

Autoradiography has been known as a method for obtaining locational information on radioactively labeled substances distributed in at least one dimensional direction to form distributed rows on a support medium.

For instance, the autoradiography comprises steps of: labeling organism-originating biopolymers such as proteins or nucleic acids with a radioactive element; resolving the radioactively labeled biopolymers, derivatives thereof, or cleavage products thereof on a gel support (support medium) through a resolving process such as gel electrophoresis; placing the gel support and a high-sensitivity type X-ray film together in layers for a certain period of time to expose said film, developing said film, obtaining the location information of the radioactively labeled substances from the developed film, and then performing the identification of the polymeric substances, determination of molecular weight thereof and isolation thereof based on the obtained locational information.

Autoradiography has a prominent advantage in that visual observation of the locational information in a cell scale or a molecular scale on radioactively labeled substances can be made by utilizing the radiography as mentioned above. However, in other words, it is essential in conventional radiography to visualize the autoradiograph having the locational information on a radiographic film in order to obtain the locational information on the radioactively labeled substances.

In fact, investigators have determined the distribution of radioactively labeled substances in a sample by observing a visualized autoradiograph with their eyes to obtain the locational information on the specific substances labeled with a radioactive element.

The certain locational information as obtained above has been further subjected to various analyses to isolate or identify radioactively labeled substances, or to determine the molecular weight or characteristics of specific substances. For instance, the above-mentioned autoradiography is used effectively to determine the base sequence of nucleic acids such as DNA, and the method is considered to be of value for determination of structure of polymeric substances originating from organisms. The determination of structure of such substances likewise requires the visual determination.

Accordingly, autoradiography is a useful method for analysis of the structure and function of tissue of organisms and/or of organism-originating substances, but it has the unfavorable feature that conventional autoradiography requires visual analysis, thereby needing a great amount of time and labor.

Further, the locational information obtained by the analysis of the autoradiograph varies depending on the investigators in charge because of inherent unreliability of visual observation, and the accuracy of the information is limited to a certain extent. Particularly, in such a case that only a small quantity of a sample has been employed, that the intensity of radiation energy emitted by the radioactively labeled substance has been low, or that the exposure has been done under unfavorable conditions, an autoradiographic image visualized on a radiographic film has reduced quality (in regard of sharpness, contrast, etc.) so that satisfactory information can not be obtained and the accuracy is low. These are drawbacks of conventional autoradiography.

In order to improve the accuracy of the locational information, for instance, a visualized autoradiograph can be scanned by means of a device such as a scanning densitometer. However, such scanning process requires increased time and complicated procedures.

In addition to the above-described disadvantages, a sample and radiographic film is required to be placed together in layers for a long period of time to expose the film to a radioactive substance contained in the sample so as to visualize the autoradiograph having the above-mentioned locational information on the radiographic film (several days are usually required). Moreover, the exposure ought to be carried out at a low temperature (0° C. to −90° C.) to avoid appearance of the chemical fog of the photosensitive silver salt in the radiographic film which is caused by various substances contained in the sample. Thus, the exposure ought to be done under specific conditions. Moreover, since the photosensitive silver salt in a radiographic film has a drawback in that it is also sensitive to physical impacts, or is apt to be physically fogged, careful and skillful handling is required. This feature further brings about another complexity in the autoradiographic procedure.

Further, the radiographic film is also exposed to certain natural radioactive substances contained in the sample other than the radioactively labeled substances under analysis during the exposure for a long period of time. Accordingly, this exposure also lowers the quality of the obtained image, in addition to the above-mentioned effects of chemical and physical fogging.

SUMMARY OF THE INVENTION

The present inventors have discovered that the information elongate one dimensional distribution of radioactively labeled substances can be analyzed by a signal processing method which utilizes a radiation image recording and reproducing method using a stimulable phosphor sheet in place of conventional radiography which uses a radiographic film employed in the conventional autoradiography. Said signal processing comprises steps of obtaining a digital signal corresponding to the autoradiograph having the locational information on the radioactively labeled substances in a sample and subsequently processing the digital signal. The autoradiography utilizing the above identified signal processing requires no human visual inspection of the autoradiograph. However, the visual embodiment of the autoradiograph can be attached to the above-mentioned signal processing.

The present invention provides a signal processing method in autoradiography for obtaining information on one dimensional location of radioactively labeled substances distributed in at least one dimensional direction on a support medium, in the form of symbol, numeral or combination thereof, which comprises:

a process for obtaining the information in the form of symbols, numerals or combinations thereof including:

(1) determining a one dimensional scanning line for signal processing; and (2) detecting sampling points on said scanning line, said process being applied to digital signal corresponding to an autoradiograph having locational information on the radioactively labeled substances, said digital signals being obtained by causing a stimulable phosphor sheet to absorb radiation energy emitted by said radioactively labeled substances on the support medium to record the autoradiograph of the radioactively labeled substances on the stimulable phosphor sheet, scanning said stimulable phosphor sheet with an electromagnetic wave to release at least a portion of radiation energy stored in said phosphor sheet in the form of the autoradiograph as a stimulated emission, and detecting said stimulated emission photoelectrically.

The visible image can be obtained in an additional step to the above-described digital processing method by an additional process for reproducing the visible image from the electric or digital signals corresponding to said autoradiograph, which have been obtained by detecting said stimulated emission photoelectrically.

DETAILED DESCRIPTION OF THE INVENTION

The radiation image recording and reproducing method which is utilized in the present invention in place of the conventional radiography is described, for instance, in U.S. Pat. No. 4,239,968, and said method comprises steps of: causing a stimulable phosphor of a stimulable phosphor sheet to absorb radiation energy having passed through an object or having been radiated by an object; exciting the stimulable phosphor with an electromagnetic wave such as visible light or infrared rays (hereinafter referred to as "stimulating rays") to sequentially release the radiation energy stored in the stimulable phosphor as light emission; photoelectrically detecting the emitted light to give an electric signal; and then reproducing the electric signal in the form of a visible image on a recording material, or converting the electric signals to digital signal through conventional A/D conversion techniques.

The stimulable phosphor sheet contains a stimulable phosphor such as a divalent europium activated alkaline earth metal fluorohalide phosphor. When exposed to a radiation such X-rays, $\alpha$-rays, $\beta$-rays, $\gamma$-rays, or ultraviolet rays, the stimulable phosphor absorbs a portion of the radiation energy and then emits light (stimulated emission) corresponding to the radiation energy stored therein upon excitation with an electromagnetic wave (stimulating rays) such as visible light or infrared rays, after the exposure.

Accordingly, in the present invention, the locational information on radioactively labeled substances one-dimensionally distributed on a support medium can be directly obtained in the form of digital signals without production of a visual embodiment by applying the above-mentioned radiation image recording and reproducing method to the autoradiography. Further, an autoradiograph having the locational information on the radioactively labeled substances can be also produced as a visible image from the digital signal or the electric signal without necessity of being subjected to A/D conversion.

The above-mentioned radiation image recording and reproducing method has the practical advantage that a radiation image can be recorded over a wider range of radiation exposures in comparison with conventional radiography. More specifically, it is known in this method that the amount of stimulated emission given by the stimulable phosphor upon excitation with stimulating rays after storing radiation energy is proportional to the amount of the radiation exposure over a wide range thereof. For this reason, the digital signal accurately corresponding to an autoradiograph of an object can be directly obtained by the above-mentioned method.

In the step of photoelectrically detecting the stimulated emission of the autoradiograph of an object, a digital signal which is hardly affected even if the level of radiation energy stored in the stimulable phosphor sheet deviates depending upon variation of the exposure conditions brought about by variation of the conditions of the object, fluctuation of the sensitivity of the stimulable phosphor sheet, and fluctuation of the sensitivity of a photosensor, can be obtained by setting the read-out gain at an appropriate value. The method can be performed with less amount of radiation from the sample than the conventional radiography, and accordingly the radioactively labeled substances in the sample which are harmful to investigators can be reduced.

Further, the digital signal having the locational information on the radioactively labeled substances, which is obtained by the above-mentioned radiation recording and reproducing method using a stimulable phosphor sheet, is processed in an appropriate signal processing circuit having a function of signal processing to give automatically the locational information in the form of desired symbol and/or numeral. Thus, this method requires no visual observation. Optionally, the locational information represented by symbol and/or numeral can be further subjected to a suitable calculation or combined with other related information to obtain a desired information such as information concerning the structure or function of substance without any manual operation.

Accordingly, the analysis of the autoradiograph can be automated by applying thereto the present invention comprising subjecting the digital signal corresponding to the autoradiograph having the locational information on the radioactively labeled substances to the digital signal processing, so that the time and labor required in the conventional radiography is reduced. Further, the locational information is obtained with high accuracy by the present invention.

Furthermore, according to the above-mentioned radiation image recording and reproducing method, the information on the relative amount of the radioactively labeled substances on respective positions is also obtainable from the intensity of stimulated emission released from the stimulable phosphor sheet, in addition to the information on one dimensional location thereof. In other words, the quantitative information such as concentration distribution of the radioactively labeled substances can be obtained without applying an additional means to the autoradiograph as in the conventional autoradiography.

In the present invention, the term "locational information" of the radioactively labeled substances means to include a variety of information relating to the location of the radioactively labeled substances, or the aggregation thereof, being present in the sample, such as the location, the shape, the concentration, the distribution and combinations thereof.

Further advantageous feature of the invention is that the autoradiograph having the locational information on the radioactively labeled substances can be obtained in the form of a visible image in addition to the locational information in the form of symbol and/or numeral. Thus, the locational information obtained in the form of the symbol and/or numeral through signal processing can be compared or checked with the visible image. Otherwise, the obtained image can be also compared with separately visualized autoradiograph. Since the conventional radiography has been heretofore employed, it is very useful to visualize the autoradiograph of the present invention for comparison and identification with the known visible autoradiograph obtained in the conventional autoradiography. The visualization of the autoradiograph in the invention makes it possible that the locational information is recorded and stored in a form of visible image, in addition to storage of the information in form of symbol and/or numeral in a magnetic tape of the like.

Further, a suitable image processing can be performed on the digital signal to obtain a well readable visible image, because the visualization of an autoradiograph of a sample is done for the electric signal and/or digital signal corresponding thereto. Furthermore, this method provides an advantage that the exposure of a stimulable phosphor sheet to a sample can be carried out under remarkably milder exposing conditions (period of time, temperature, etc.) than that required in the conventional radiography. This also brings about the improvement in the accuracy of autoradiography and the simplification of operation thereof.

Examples of the sample used in the present invention include a support medium on which radioactively labeled substances are resolved in one dimensional direction to form a resolved row. Examples of the radioactively labeled substances include biopolymers, derivatives thereof, or cleavage products thereof, being labeled with a radioactive element.

For instance, in the case that the radioactively labeled biopolymers are polymeric substances such a protein, nucleic acid, derivatives thereof and cleavage products thereof, the present invention is useful for isolation and identification thereof. Further, the present invention can be effectively used to analyze the whole or partial molecular structures of these biopolymers and the basic segmental constitutions thereof.

Representative examples of the method for resolving (or developing) the radioactively labeled substances on a support medium include an electrophoresis using one of various resolving mediums such as a gel in the form of layer, column or the like, a molded polymer film such as a cellulose diacetate film, and a filter paper, and a thin layer chromatography using a support of material such as silica gel. However, the method employable in the present invention is by no means restricted to these methods.

Samples employable in the present invention are by no means restricted to the above-mentioned samples, and any other samples can be used, provided that the sample is a support medium containing the radioactively labeled substances distributed one-dimensionally thereon and the autoradiograph having the locational information thereof can be recorded on the stimulable phosphor sheet.

The stimulable phosphor sheet used in the present invention has a basic structure comprising a support, a phosphor layer and a transparent protective film. The phosphor layer comprises a binder and a stimulable phosphor dispersed therein, and for instance, it is obtained by dispersing particulate divalent europium activated barium fluoride ($BaFBr:Eu^{2+}$) phosphor particles in a mixture of nitrocellulose and linear polyester. The stimulable phosphor sheet is, for example, prepared by providing the above-mentioned phosphor layer onto the support such as a polyethylene terephthalate sheet and then providing a protective film such as a polyethylene terephthalate sheet on the phosphor layer.

In carrying out the exposing procedure, that is, the procedure of storing the radiation energy released from the support medium containing the radioactively labeled substance in the stimulable phosphor sheet, at least a portion of the released radiation energy is absorbed in the stimulable phosphor sheet by placing the support medium and stimulable phosphor sheet together in layers for a certain period of time. The exposure can be accomplished by keeping the phosphor sheet in a position adjacent to the support medium, for instance, at a room temperature or lower temperature for at least several seconds.

Detailed description on the stimulable phosphor sheet and the exposing procedure employable in the invention is given in Japanese Patent Application No. 57(1982)-193418 (U.S. patent application filed on Nov. 7, 1983 corresponding thereto, and European Patent Application No. 83 110 984.8).

A method for reading out or detecting the information on one dimensional location of the radioactively labeled substances in the sample copied and stored in the stimulable phosphor sheet according to the invention will be described briefly, referring to an embodiment of a read-out system shown in FIG. 1 of the accompanying drawings.

Figure 1:
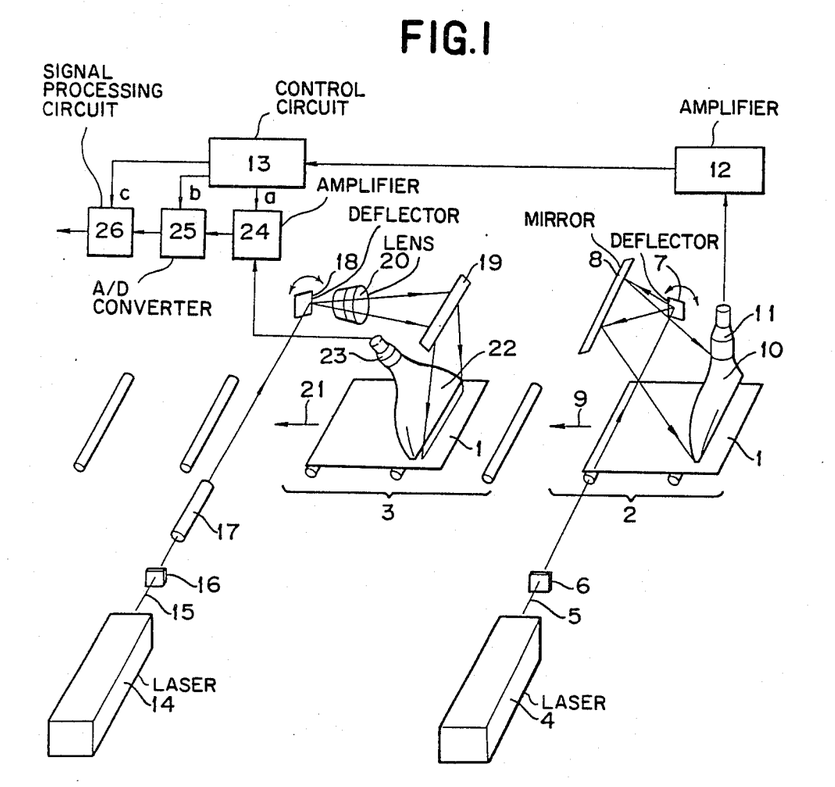
FIG. 1 shows an example of the read-out system for reading out the locational information of the radioactively labeled substances copied for the sample and stored in a stimulable phosphor sheet employable in the present invention.

FIG. 1 schematically illustrates an embodiment of the read-out system comprising a preliminary read-out section 2 for preliminarily reading out the one dimensional information on the location of the radioactively labeled substances stored (or recorded) in the stimulable phosphor sheet 1 (from which the sample generally has been removed; the stimulable phosphor sheet is hereinafter referred to as "phosphor sheet"), and a final read-out section 3 for finally reading out the desired locational information on the radioactively labeled substance stored in the phosphor sheet 1.

In the preliminary read-out section 2, the preliminary read-out operation is carried out in the following manner.

Laser beam 5 generated by a laser source 4 first passes through a filter 6 to cut off a light beam in the wavelength region corresponding to the wavelength region of stimulated emission to be emitted from the phosphor sheet 1 in response to stimulation with the laser beam 5. The laser beam 5 is subsequently deflected by a beam deflector 7 such as a galvanometer mirror, and reflected by a plane reflecting mirror 8. The deflected beam then impinges upon the phosphor sheet 1. The laser source 4 used herein is so selected as to avoid overlapping of the wavelength region of the laser beam 5 with the main wavelength region of the stimulated emission to be emitted from the phosphor sheet 1.

The phosphor sheet 1 is transferred to the direction along the arrow 9 under the irradiation of the above-mentioned deflected laser beam. Therefore, the whole surface of the phosphor sheet 1 is subjected to the irradiation of the deflected laser beam. The power of the laser beam 5 employed in the preliminary read-out section is adjusted to be lower than the power of the laser beam to be employed in the final read-out section by controlling the output of the laser source 4, the beam diameter of the laser beam 5, the scanning speed of the laser beam 5, and the transferring speed of the phosphor sheet 1.

When irradiated with the above-mentioned laser beam, the phosphor sheet 1 gives the stimulated emission having the emission intensity proportional to the radiation energy stored (or recorded) therein. The emission then enters into a light guiding sheet 10 for the preliminary read-out. The light guiding sheet 10 has a linear edge face for receiving the emission, and the edge face is so positioned in the vicinity of the phosphor sheet as to correspond to the scanning line on the phosphor sheet 1. The exit of the light guiding sheet 10 is in the form of a ring and is connected to a light-receiving face of a light detector 11 such as a photo-multiplier. The light guiding sheet 10 is made, for instance, by processing a sheet of a transparent thermo-plastic resin such as a polyacrylic synthetic resin, and so constituted that the emission introduced from the linear edge face is transmitted to the exit under repeated total reflection within the sheet 10. The stimulated emission from the phosphor sheet 1 is guided in the interior of the light guiding sheet 10 to the exit, and received by the light detector 11.

The preferable shape and material of the light guiding sheet is disclosed in Japanese Patent Provisional Publications No. 55(1980)-87970 and No. 56(1981)11397.

On the light-receiving face of the light detector 11 is provided a filter which allows only the light of the wavelength region of the stimulated emission to pass through and cuts off the light of the wavelength region of the stimulating rays (laser beam) so as to detect only the stimulated emission. The stimulated emission detected by the light detector 11 is converted to an electric signal, amplified in an amplifier 12 and transmitted to the output. The stored information output from the amplifier 12 is supplied to a control circuit 13 of the final read-out section 3. The control circuit 13 provides an amplification degree setting value a and a scale factor setting value b, for obtaining signals at an appropriate level. In the case of further reproducing the autoradiograph in the form of a visible image, an image processing condition setting value c is set so that a well readable image having a uniform concentration and contrast can be attained regardless of variation of the detected information.

The phosphor sheet 1 having been subjected to the preliminary read-out in the above-described manner is then transferred to the final read-out section 3.

In the final read-out section 3, the following read-out operation is performed.

The laser beam 15 generated by a laser source 14 for the final read-out passes through a filter 16 having the same function as that of the above-mentioned filter 6, and then the beam diameter is precisely adjusted in a beam expander 17. Subsequently, the laser beam is deflected by a beam deflector 18 such as a galvanometer mirror, and reflected by a plane reflection mirror 19. The deflected beam then impinges one-dimensionally upon the phosphor sheet 1. Between the beam deflector 18 and the plane reflection mirror 19 a $f\theta$ lens 20 is provided so that the beam speed is continuously kept constant when the deflected laser beam is scanned on the phosphor sheet 1.

The phosphor sheet 1 is transferred in the direction along the arrow 21 under the irradiation by the above-mentioned deflected laser beam. Accordingly, the whole surface of the phosphor sheet is subjected to irradiation in the same manner as in the preliminary read-out operation.

When irradiated with the above-mentioned laser beam, the phosphor sheet 1 gives the stimulated emission in proportion to the radiation energy stored therein in the same manner as in the preliminary read-out operation. The emission then enters into a light guiding sheet 22 for the final read-out. The light guiding sheet 22 for the final read-out is made of the same material and has the same constitution as the light guiding sheet 10 employed for the preliminary read-out. The stimulated emission received is guided in the interior of the light guiding sheet 22 up to the exit under repeated total reflection, and then received by a light detector 23. On the light-receiving face of the light detector 23 is provided a filter which allows only the light of the wavelength region of the stimulated emission to pass through and cuts off the light of the wavelength region of the stimulating rays (laser beam) so as to detect only the stimulated emission. The stimulated emission detected by the light detector 23 is converted to an electric signal, amplified to an electric signal an appropriate level in an amplifier 24 according to the aforementioned amplification degree by the setting of a value a by the control circuit 13, and is transmitted to an A/D converter 25. The adjusted electric signal is then converted to a digital signal in the A/D converter 25 according to an appropriate scale factor determined by the control circuit 13 as the scale factor value b.

In the above description on the method for reading out the locational information on the radioactively labeled substances which have been copied and stored in the stimulable phosphor sheet, a read-out operation involving both the preliminary read-out operation and the final read-out operation has been given. However, the read-out operation employable in the present invention is not limited to the above-described embodiment. For instance, the preliminary read-out operation may be omitted if the content of the radioactive substances in the sample and an adequate exposure time for the sample is previously known.

Further, other suitable methods than the above-mentioned embodiments may be used for reading out the locational information of the radioactively labeled substances copied from the sample and stored in the stimulable phosphor sheet.

Thus, the obtained digital signal corresponding to the autoradiograph of the radioactively labeled substances is subsequently input into a signal processing circuit 26 shown in FIG. 1. In the signal processing circuit 26, the digital signal is processed to give locational information on the radioactively labeled substances in the form of symbols and/or numerals. More in detail, the scanning line being analyzed for the signal processing step is determined and then sampling points along the scanning line are detected in the circuit 26. If desired, the signal can be further processed to obtain a two-dimensional embodiment of the autoradiograph determined by the control circuit 43 by the setting of the value c.

The digital signal processing operation according to the present invention is described below, referring to an example of an autoradiograph of a resolved row obtained by resolving a mixture of radioactively labeled substances on a support medium through electrophoresis or the like.

Figure 2:
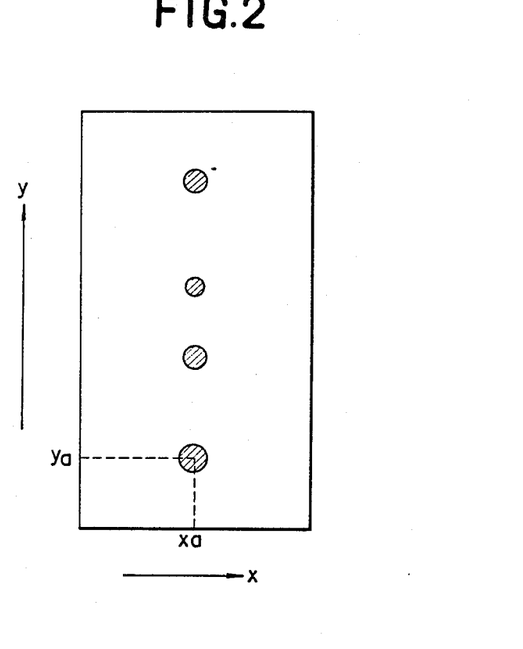
FIG. 2 shows an example of an autoradiograph of a sample in which radioactively labeled substances are resolved in one dimensional direction.

FIG. 2 shows an example of the autoradiograph of a sample which comprises the support medium on which a plurality of radioactively labeled substances are resolved linearly in the longitudinal direction thereof. The digital signal obtained by applying the radiation image recording and reproducing method to the sample as described above, that is, the digital signal received by the signal processing circuit 26 shown in FIG. 1, is provided with an address (X, Y) which is represented by a coordinate system defined by the stimulable phosphor sheet and with a signal level (Z) in each address corresponding to the intensity of stimulated emission. Accordingly, the digital signal corresponds to the autoradiograph shown in FIG. 2. In other words, the digital image data having the locational information on the above-mentioned radioactively labeled substances are given to the signal processing circuit 26. In the present invention, the term "digital image data" means a set of digital signals corresponding to the autoradiograph of the radioactively labeled substances.

In the first step for the processing, the scanning line for the digital signal processing is determined with respect to the above-mentioned digital signal. In FIG. 2, the scanning line can be determined, for instance, by the following manner in which the vertical direction (namely, resolving direction) is referred to as a Y-axis direction and the horizontal direction as an X-axis direction: the digital image data obtained as above are obtained by scanning to obtain numerical data along the X-axis direction and X coordinate ($X_a$) at which the signal exhibits maximum levels. The scanning along the X-axis direction can be done at any position along the Y-axis (for instance, at $Y=Y_a$), but the scanning is necessarily done in such a sufficient width as to cover at least one resolved band of the radioactively labeled substance.

In the signal processing method of the present invention, the digital signal (obtained by reading out the information as the light emitted from the stimulable phosphor sheet) is stored temporarily in a memory device of the signal processing circuit 26 (that is, stored in a non-volatile memory unit such as a buffer memory, a magnetic disk, etc.). In the signal processing operation, the scanning of the digital image data means is performed to selectively pick up (from the stored signals in the memory device) only the signals in the scanning area.

Therefore, the X coordinate ($X_a$) of the greatest signal strength can be determined for instance, by repeatedly picking up digital signals within the above scanning area along the Y axis, summing the levels of the selected digital signals for all X coordinates, and locating the position at which the sum of the signal levels is the highest. Alternatively, the X coordinate ($X_a$) can be detected by repeatedly selecting digital signals within the above scanning area along the X axis, detecting an X coordinate at which the signal level is the highest for every Y coordinate, and determining the X coordinate through calculation of the average coordinate for all X coordinates. In order to remove noise peaks which are possibly picked up in the scanning in addition to the desired signal, the signal level may be made two-valued with a previously set threshold value.

The straight line which passes through the X coordinate ($X_a$) detected as mentioned above and is parallel to the Y-axis is assigned to the scanning line for the signal processing procedure described below.

In the second step, sampling points on the scanning line are detected. All points at which the signal exhibits a maximum level detected in the course of picking up the digital signals on the scanning line can be assigned to the sampling points for detecting resolved bands (points) of the radioactively labeled substances. This scanning procedure along the scanning line is also desirably done with a certain width. Thus, the term "maximum points of the signal level" means all the peak points given in a two-dimensional graph in which the position (Y) is plotted along the abscissa (horizontal axis) and the means value (Z) of the signal levels within the scanning width is plotted along ordinate (vertical axis). Hereinafter, the mean value of the signal level at each position (in each width) on the scanning line is simply referred to as the signal level at the position.

Figure 3:
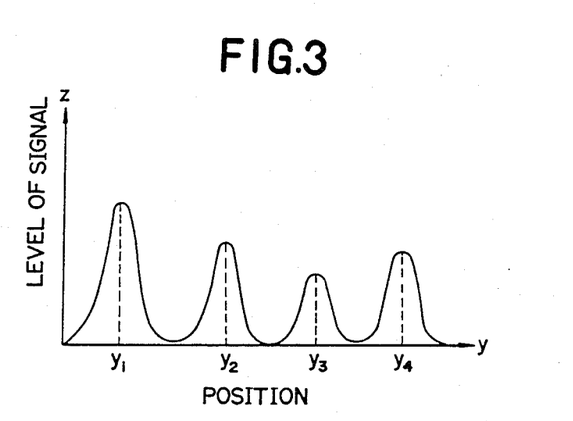
FIG. 3 graphically shows a typical relationship between the level of a digital signal versus position along a scanning line for signal processing.

FIG. 3 shows a graph in which the position (Y) on the scanning line is given on abscissa and the signal level is given on the ordinate.

As stated above, a sampling point $S_n$ having a coordinate and a signal level at its coordinate ($X_a$, $Y_n$, $Z_n$) is determined, wherein n is a positive integer and represents the number of each sampling point.

By applying the signal processing to the digital signal as described above, the information on the dimensional location of the radioactively labeled substances can be represented by a combination of the position in the one dimensional direction and the signal level at its position ($Y_n$, $Z_n$). The signal level ($Z_n$) at each position is assumed to indicate the relative amount (concentration) of the radioactively labeled substance.

Further, if the starting position for resolving the radioactively labeled substances is recorded previously on the stimulable phosphor sheet with a maker containing a radioactive element, the starting position ($Y_O$) can be detected on the digital image data in the same manner as described above with reference to the analysis of stored data signals. Otherwise, the starting position ($Y_O$) can be detected by beforehand providing the stimulable phosphor sheet itself with a mechanical identification means, such as, by punching the sheet to provide a perforation thereof, and superposing the starting position on a support medium on the perforation on the sheet in the initial stage of the exposing procedure. The locational information can be represented by a combination of the migration distance ($Y_n'$) from the starting position of the resolution which is given by calculation according to the subtraction equation $\{Y_n - Y_O = Y_n'\}$ and the signal level at its position, namely ($Y_n'$, $Z_n$).

The relative amount of the radioactively labeled substance can be determined from, for instance, the integrated value in the vicinity of the maximum point or differently calculated values as well as from the signal level at the above-mentioned sampling point.

The signal on the autoradiograph having the information on a one dimensional location (relative to the Y axis) of the radioactively labeled substances can be output from the signal processing circuit 26 in the form of the above-mentioned numeric values. It should be understood however that the one dimensional information on the location of the radioactively labeled substances given in the form of the coordinate of the sampling point $S_n$ and the signal level at its coordinate ($X_a$, $Y_n$, $Z_n$) can be represented by other optional representation modes.

Thus, the one dimensional information can be obtained in the form of symbols, numerals or combinations thereof.

The thus obtained symbols and/or numerals are transmitted to a recording device (not shown), directly or optionally via storage in a storing means such as a magnetic tape.

Various recording devices based on various systems can be employed for the above described purpose, for instance, a device for visually presenting an image optically by scanning a photosensitive material with laser beam, etc., a display means for visualizing electrically on a CRT, etc., a means for printing a radiation image displayed on the CRT by means of a video printer, and a means for visualizing an image on heat-sensitive recording material using thermic rays. In the case that the autoradiograph stored in the stimulable phosphor sheet is to be further visualized in the form of an image, the signal processing (image processing) in the signal processing circuit 26 may be performed according to the image processing condition setting value c, so as to give a well readable visible image having well adjusted concentration and contrast. Examples of the image processing include known techniques such as spatial frequency processing, gradation processing, addition averaging processing, reduction processing, and enlarging processing.

The digital signal which has been subjected to such image processing is transmitted to a reproducing device, optionally via storage in a storing means such as a magnetic tape.

A procedure for reproducing (recording) an image from the digital signal having the locational information on the radioactively labeled substances upon image processing will be described below briefly referring to a block diagram of a reproducing system shown in Figure 4.

Figure 4:
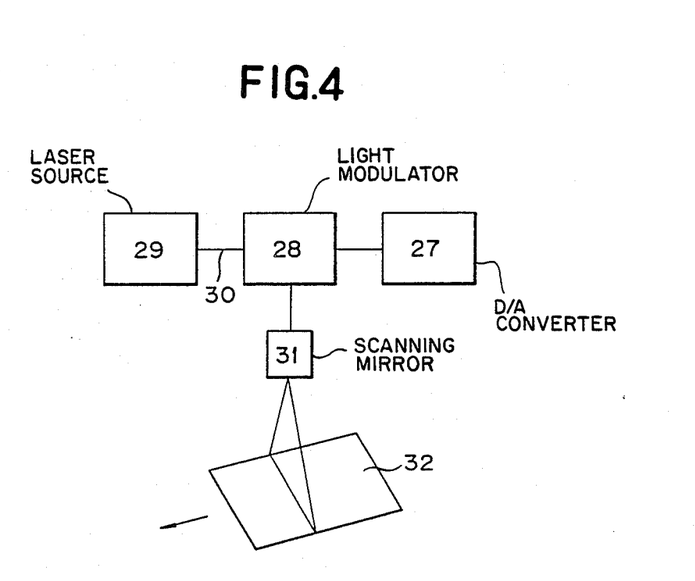
FIG. 4 shows an example of a reproducing system for producing a visual embodiment of the digital signal having the locational information on the radioactively labeled substances copied from a sample and stored in a stimulable phosphor sheet employable in the present invention.

FIG. 4 is a block diagram showing the outline of the reproduction system for reproducing an image from the digital signal output from the read-out system shown in FIG. 1.

The reproducing procedure is carried out to obtain the locational information on the radioactively labeled substances in the form of an image in the following manner: The signal is input to the D/A converter 27 to convert to the analogue signal representing the density. The analogue signal is then input to a light modulator 28 and the light modulator 28 is modulated according to the analogue signal. The laser beam 30 generated by a laser source 29 for recording is modulated in the light modulator 28, and subsequently is forced to scan on a photosensitive material 32 such as a photographic film by means of a scanning mirror 31, so that an image is reproduced on the photosensitive material 32.

The procedure for reproducing an image from the digital signal is by no means limited to the abovementioned procedure, and for instance, a procedure using the aforementioned recording devices may be utilized.

Otherwise, the visual image of the autoradiograph can be also obtained by reproduction from the electric signal which is not A/D-converted to the digital signal. That is, the visual image can be obtained by transmitting the electric signal obtained in the amplifier 24 of the read-out system shown in FIG. 1 directly to the light modulator 28 of the reproducing system shown in FIG. 4.

The present invention also provides a signal processing method in autoradiography of a sample containing groups of radioactively labeled substances which are distributed in the one dimensional direction to form plural rows.

The above-mentioned method resides in a signal processing method in autoradiography for obtaining information on one dimensional location of groups of radioactively labeled substances arranged in plural rows and distributed respectively in at least one dimensional direction on a support medium, in the form of symbols, numerals or combinations thereof, which comprises a process including:

(1) determining on each of the plural rows one dimensional scanning line for signal processing;

(2) detecting on each of the plural rows sampling points on said scanning line; and (3) comparing and identifying said sampling points detected in the plural rows, said process being applied to digital signals corresponding to an autoradiograph having the locational information on the groups of radioactively labeled substances, said digital signal being obtained by causing a stimulable phosphor sheet to absorb radiation energy emitted by the groups of radioactively labeled substances on the support medium to record the autoradiograph of the groups of radioactively labeled substances on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically.

The visible image can be further obtained by attaching to the above-described digital processing method an additional process for reproducing the visible image from an electric or digital signal corresponding to said autoradiograph obtained by detecting said stimulated emission photoelectrically.

The sample used in the above-mentioned process generally comprises a support medium containing groups of the radioactively labeled substances, each group being distributed in one dimensional direction, to form plural rows in parallel to each other. The term "parallel" does not necessarily mean the strictly parallel relation in which the above-mentioned plural rows are strictly parallel to each other, and includes a locally parallel or approximately parallel relation.

In particular, the above-mentioned signal processing method in the autoradiography is effectively applicable to analyze the molecular weight, molecular structure and basic unit constitution, of polymeric substances such as protein, nucleic acid, derivatives thereof or cleavage products thereof.

Accordingly, the present invention further provides a signal processing method in autoradiography for determining the base sequence of a DNA or DNA fragment, employing at least four groups of base specific cleavage products consisting of:

(1) base specific cleavage products including at least guanine specific cleavage products;

(2) base specific cleavage product including at least adenine specific cleavage products;

(3) base specific cleavage product including at least cytosine specific cleavage products; and (4) base specific cleavage product including at least thymine specific cleavage products, which are obtained by specific cleavage of the DNA or DNA fragment which has been labeled with a radioactive element, and resolved respectively in a one dimensional direction to form resolved rows on a support medium, which comprises a process including:

(1) determining on each of the resolved rows one dimensional scanning line for signal processing;

(2) detecting on each of the resolved rows sampling points on said scanning line; and (3) comparing and identifying the positions of said sampling points on the scanning lines among the resolved rows to obtain locational information on guanine, adenine, thymine and cytosine, said process being applied to digital signals corresponding to an autoradiograph having the locational information on the groups of radioactively labeled cleavage products, said digital signal being obtained by causing a stimulable phosphor sheet to absorb radiation energy emitted by the groups of radioactively labeled cleavage products on the support medium to record the autoradiograph of the groups of radioactively labeled cleavage products on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically.

The visible image can be further obtained by attaching to the above-described digital processing method an additional process for reproducing the visible image from an electric or digital signal corresponding to said autoradiograph obtained by detecting said stimulated emission photoelectrically.

An embodiment of the signal processing in the autoradiography utilizing the signal processing method of the present invention will be described referring to a determination of a base sequence of DNA.

DNA is in the form of double helix structure consisting of two chain molecules and the two chain molecules are constituted by four constitutional base units, each unit having a base, namely adenine (A), guanine(G), thymine (T), or cytosine (C). The two chain molecules are cross-linked by hydrogen bonding between the four constitutional base units, and the hydrogen bonding between each base comprises only two combinations, namely G-C and A-T. Therefore, if the base sequence of one chain molecule is determined, that of the other chain molecule is automatically determined.

As a representative method for determining the base sequence of DNA utilizing the autoradiography, Maxam-Gilbert method has been known. In this method, a group containing a radioactive isotope of phosphorus (P) is attached to a chain molecule of DNA or a DNA fragment at one end to be sequenced to prepare a radioactively labeled DNA molecule, and then the radioactively labeled DNA molecule is specifically cleaved at the specific constitutional base unit by a certain chemical reaction. This reaction is called a "base specific cleavage reaction". Then the obtained mixture of numerous cleavage products of the DNA or DNA fragment is resolved through gel electrophoresis to yield a resolved pattern of the numerous cleavage products (the pattern is not visible).

In the conventional procedure, an X-ray film is exposed to the resolved pattern and developed to obtain a visualized autoradiograph thereon, and the sequential position of each base from the radioisotopically labeled end of the chain molecules is read by referring both the obtained autoradiograph and the applied base specific chemical reaction so as to determine the sequence of all bases in the substance.

The signal processing method for the determination of base sequence of DNA or its derivative, fragment, etc., will be described by an embodiment utilizing the above-mentioned Maxam-Gilbert method, referring to the case of employing the following four groups of base specific cleavage products as a typical combination of base specific cleavage product groups:

(1) guanine (G) specific cleavage products, (2) guanine (G) specific cleavage products +guanine (A) specific cleavage products, (3) thymine (T) specific cleavage products +cytosine (C) specific cleavage products, (4) cytosine (C) specific cleavage products.

The DNA is radioactively labeled with $^{32}P$ and the radioactively labeled DNA is subjected to the specific cleavage reaction for each base (constitutional unit of DNA), to prepare the above-mentioned four groups of base specific cleavage products. The four groups of specific cleavage products are then resolved on a gel support medium through electrophoresis to obtain a developed sample. Then, the sample (support medium) is placed on a stimulable phosphor sheet together in layers at room temperature for several minutes to perform the exposure, and the resolved pattern (of four resolved rows) in the sample is copied onto the stimulable phosphor sheet as an autoradiograph. Details of above-mentioned exposure procedure is described in the aforementioned Japanese Patent Application No. 57(1982)-193418.

Figure 5:
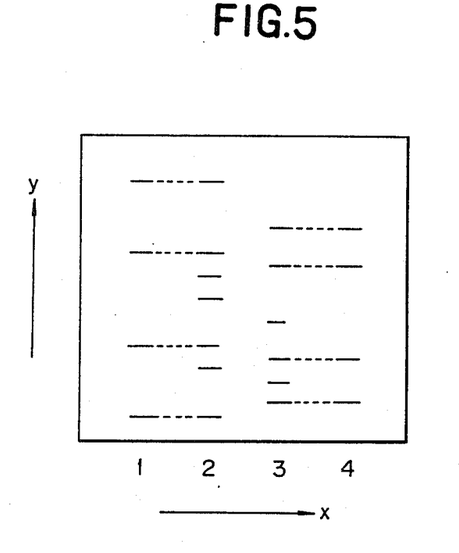
FIG. 5 shows an example of an autoradiograph of a sample in which base specific cleavage products of DNA are resolved on a gel support medium.

FIG. 5 schematically shows an autoradiograph of electrophretically resolved pattern consisting of the above-mentioned four groups of radioactively labeled base specific cleavage products. That is, the first to the fourth columns shown in FIG. 5 in order correspond to:

(1) (G) specific cleavage products, (2) (G) specific cleavage products +(A) specific cleavage products, (3) (T) specific cleavage products +(C) specific cleavage products, (4) (C) specific cleavage products.

The stimulable phosphor sheet containing the autoradiograph is copied, then is installed on the read-out system shown in FIG. 1 to carry out the read-out operation, and the digital signal corresponding to the autoradiograph is obtained.

The obtained digital signal is subjected to the digital signal processing in the signal processing circuit 26 as mentioned above.

In the first step, the scanning line for the signal processing for the four rows given in the autoradiograph is respectively determined by the digital signal processing in the same manner as aforementioned. For instance, a line passing over the X-coordinate ($X_a$) and being parallel to Y-axis is assigned to the scanning line for each row, wherein a is a positive integer and represents the number of each row.

In the second step, all points at which the signal exhibits a maximum level are assigned to sampling points for detection in the same manner as described hereinbefore. Thus, the sampling point $S_{an}$ having a coordinate and a signal level at its coordinate ($X_a$, $Y_{an}$, $Z_{an}$) is determined for each row, wherein n is an integer and represents the number of each sampling point.

In the third step, the above-mentioned four rows are rearranged. That is, using the first row having the sampling points $S_{1n}$ represented by ($X_1$, $Y_{1n}$, $Z_{1n}$) and the second row having the sampling points $S_{2n}$ represented by ($X_2$, $Y_{2n}$, $Z_{2n}$), the following calculation is done:

$$\{\overline{Y_{1n}}\} \cap \{Y_{2n}\} = \{Y_{5n}\}$$

to form a new set of $\{Y_{5n}\}$ according to the fact that a set of Y-coordinates $\{Y_{1n}\}$ of the sampling points in the first row is included in a set of $\{Y_{2n}\}$ of the sampling points in the second row. Then, using this set of Y coordinates and the signal levels corresponding thereto, an imaginary fifth row having sampling points $S_{5n}$ represented by ($Y_{5n}$, $Z_{5n}$) is obtained. The obtained fifth row has the locational information on adenine (A) alone. The same calculations as mentioned above are performed between the third row having the sampling points $S_{3n}$ represented by ($X_3$, $Y_{3n}$, $Z_{3n}$) and the fourth row having the sampling points $S_{4n}$ represented by ($X_4$, $Y_{4n}$, $Z_{4n}$), to obtain an imaginary sixth row having sampling points $S_{6n}$ represented by ($Y_{6n}$, $Z_{6n}$). The sixth row has the locational information on thymine (T) alone. Thus, one dimensional information consisting of the following four columns is obtained:

(1) (G) specific cleavage products
(5) (A) specific cleavage products
(6) (T) specific cleavage products
(4) (C) specific cleavage products.

Figure 6:
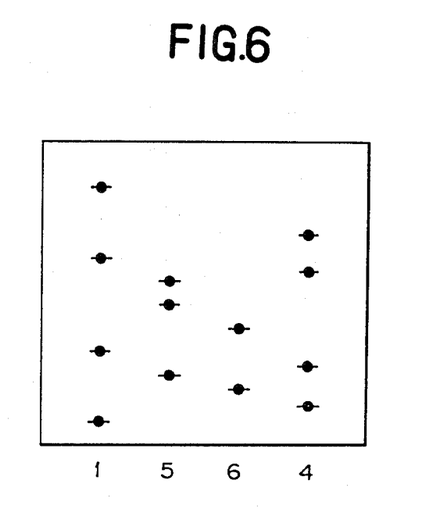
FIG. 6 shows an example schematically illustrating the base sequence of DNA determined by the signal processing in accordance with the present invention.

FIG. 6 illustrates the locational information on the above four rows rearranged through the above calculation.

In the fourth step, these four rows are compared with each other with respect to the position ($Y_{an}$) to arrange the sampling points in the order of from the farthest position to the starting position. For instance, the following scheme is obtained:

$S_{11}$, $S_{41}$, $S_{12}$, $S_{42}$, $S_{51}$, $S_{52}$, $S_{61}$, $S_{13}$, $S_{43}$, ...

Replacing $S_{an}$ in the scheme according to $S_{1n}=G$, $S_{4n}=C$, $S_{5n}=A$, and $S_{6n}=T$, the following scheme is obtained:

G—C—G—C—A—A—T—G—C—...

Therefore, the base sequence of one chain molecule of DNA can be determined. The representation mode of the obtained information on the base sequence of DNA is by no means limited to the above-mentioned mode, and any other representation mode may be utilized optionally. For instance, the signal level ($Z_{an}$) at the sampling point in the above-mentioned signal processing can be represented by the relative amount of each cleavage product resolved. Otherwise, the illustrative representation as shown in FIG. 6 is also possible.

Furthermore, the base sequence of two chain molecules of DNA can be represented in combination. That is, by giving the information on the combination between the four bases, namely A—T and G—C, the base sequence of DNA represented by the following scheme is obtained:

G—C—G—C—A—A—T—G—C—...

C—G—C—G—T—T—A—C—G—...

The method for determining the base sequence of DNA utilizing the above-mentioned combination (G, G+A T+C, C) is an example of the determination of the base sequence of DNA. The signal processing of the present invention is by no means limited to the above-mentioned combination, and various combinations are employable and the base sequence of DNA can be determined by applying thereto the corresponding method in the same manner as described above. For instance, the set or combination (G, A, T, C) can be employed to determine the base sequence of DNA. Otherwise, the combination of at least one group of base specific cleavage products and a suitable reference substance (for example, a mixture of all base specific cleavage products) can be compared to determine the sequence of the specific base.

In the above-mentioned example the present invention was described by using four columns of the radioactively labeled products resolved one-dimensionally on a support medium, but the number of the resolved rows is by no means limited to four, and may be more or less. Further, the base sequence of two or more types of DNA can be determined simultaneously using one support medium.

The information on the base sequence of DNA determined through the above-mentioned signal processing is output from the signal processing circuit 26, and can be subsequently recorded using the above-mentioned recording devices or the like.

It is further possible to perform the processing for genetic philological information such as comparison processing between the obtained base sequence of the DNA and the base sequence of another DNA which has been already recorded and stored in a suitable place.

Moreover, the digital signal, or the electric signal which has not been A/D-converted to the digital signal, can be input to the reproducing device such as one shown in FIG. 4 and subsequently reproduced on the photosensitive material such as a photographic film as described above. Switchable image processing may be applied to the digital signal in advance of the reproduction of the visible image.

We claim:

1. A signal processing method in autoradiography for obtaining information at a one dimensional location of radioactively labeled substances distributed in at least one dimensional direction on a support medium, the information being in the form of symbols, numerals and combinations of the numerals and the symbols, which comprises a process including:

(1) determining a one dimensional scanning line for signal processing; and (2) detecting sampling points on said scanning line, said process being applied to digital signals corresponding to an autoradiograph having the locational information on the radioactively labeled substances, said digital signal being obtained by causing a stimulable phosphor sheet to absorb radiation energy emitted by said radioactively labeled substances on the support medium to record the autoradiograph of the radioactively labeled substances on the stimulable phosphor sheet, scanning said stimulable phosphor sheet with an electromagnetic wave to release at least a portion of the radiation energy stored in said phosphor sheet in the form of the autoradiograph as stimulated emission, and detecting said stimulated emission photoelectrically.

2. The signal processing method in autoradiography as claimed in claim 1 in which all points on said scanning line at which the signal exhibits a maximum level are assigned to sampling points on the scanning line.

3. The signal processing method in autoradiography as claimed in claim 1 or 2, in which said radioactively labeled substances distributed on the support medium are biopolymers, derivatives of the biopolymers, or cleavage products thereof, labeled with a radioactive element and resolved on the support medium in one dimensional direction.

4. The signal processing method in autoradiography as claimed in claim 3, in which said biopolymers are nucleic acids, derivatives of said nucleic acids or cleavage products of said nucleic acids; and said symbols, numerals and combinations of said symbols and said numerals obtained by said signal processing represents a base sequence of the biopolymers.

5. A signal processing method in autoradiography for obtaining information on the one dimensional location of groups of radioactively labeled substances arranged in plural columns and distributed respectively in at least one dimensional direction on a support medium, the information being in the form of symbols, numerals and combinations of the symbols and the numerals, which comprises a process including:

(1) determining one each of the plural columns a one dimensional scanning line for signal processing;

(2) detecting on each of the plural columns sampling points on said scanning line; and (3) comparing and identifying said sampling points detected in the plural columns, said process being applied to digital signals corresponding to an autoradiograph having the locational information on the groups of radioactively labeled substances, said digital signal being obtained by causing a stimulable phosphor sheet to absorb radiation energy emitted by the groups of radioactively labeled substances on the support medium to record the autoradiograph of the groups of radioactively labeled substances on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically.

6. The signal processing method in autoradiography as claimed in claim 5, in which all points on said scanning line at which the signal exhibits maximum levels are assigned to sampling points on the scanning line.

7. The signal processing method in autoradiography as claimed in claim 5 or 6, in which said comparing and identifying of the sampling points are performed by numerical calculation on the positions of sampling points on the scanning lines among the plural rows.

8. The signal processing method in autoradiography as claimed in claim 5 or 6, in which said groups of radioactively labeled substances distributed on the support medium are biopolymers, derivatives of the biopolymers, or cleavage products thereof, labeled with a radioactive element and resolved on the support medium in one dimensional direction.

9. The signal processing method in autoradiography as claimed in claim 8, in which said biopolymers are nucleic acids, derivatives of said nucleic acids or cleavage products of said nucleic acids; and said symbols, numerals and combinations of said symbols and said numerals obtained by said signal processing represents a base sequence of biopolymers.

10. A signal processing method in autoradiography for determining base sequence of DNA or DNA fragment, employing at least four groups of base specific cleavage products consisting of:

(1) base specific cleavage products including at least guanine specific cleavage products;

(2) base specific cleavage products including at least adenine specific cleavage products;

(3) base specific cleavage products including at least cytosine specific cleavage products; and (4) base specific cleavage products including at least thymine specific cleavage products, which are obtained by specific cleavage of the DNA or DNA fragment which has been labeled with a radioactive element, and resolved respectively in one dimensional direction to form resolved columns on a support medium, which comprises a process including:

(1) determining on each of the resolved columns a one dimensional scanning line for signal processing;

(2) detecting on each of the resolved columns sampling points on said scanning line; and (3) comparing and identifying the positions of said sampling points on the scanning lines among the resolved columns to obtain locational information on guanine, adenine, thymine and cytosine, said process being applied to digital signals corresponding to an autoradiograph having the locational information on the groups of radioactively labeled cleavage products, said digital signals being obtained by causing a stimulable phosphor sheet to absorb radiation energy emitted by the groups of radioactively labeled cleavage products on the support medium to record the autoradiograph of the groups of radioactively labeled cleavage products on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically.

11. The signal processing method in autoradiography as claimed in claim 10, in which said groups of base specific cleavage products of DNA or DNA fragment include at least four groups consisting of:

(1) guanine specific cleavage products;
(2) guanine specific cleavage products and adenine specific cleavage products;
(3) thymine specific cleavage products and cytosine specific cleavage products; and
(4) cytosine specific cleavage products.

12. A signal processing method in autoradiography for obtaining information on the one dimensional location of radioactively labeled substances distributed in at least one dimensional direction on a support medium, in the form of symbols, numerals or combinations of the symbols and the numerals and a visible image, which comprises;
   (I) a process for obtaining the information in the form of symbols, numerals or combinations of the symbols and the numerals including:
   (1) determining a one dimensional scanning line for signal processing; and
   (2) detecting sampling points on said scanning line, said process being applied to digital signals corresponding to an autoradiograph having the locational information on the radioactively labeled substances, said digital signals being obtained by causing a stimulable phosphor sheet to absorb radiation energy emitted by said radioactively labeled substances on the support medium to record the autoradiograph of the radioactively labeled substances on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically, and
   (II) a process for reproducing the visible image from an electric or digital signal corresponding to said autoradiograph obtained by detecting said stimulated emission photoelectrically.

13. The signal processing method in autoradiography as claimed in claim 12, in which all points on said scanning line at which the signal exhibits maximum levels are assigned to sampling points on the scanning line.

14. The signal processing method in autoradiography as claimed in claim 12 or 13, in which said radioactively labeled substances distributed on the support medium are biopolymers, derivatives of the biopolymers, or cleavage products thereof, labeled with a radioactive element and resolved on the support medium in one dimensional direction.

15. The signal processing method in autoradiography as claimed in claim 14, in which said bipolymers are nucleic acids, derivatives of said nucleic acids or cleavage products of said nucleic acids; and said symbols, numerals and combinations of said symbols and said numerals obtained by said signal processing represents a base sequence of biopolymers.

16. A signal processing method in autoradiography for obtaining information on a one dimensional location of groups of radioactively labeled substances arranged in plural columns and distributed respectively in at least one dimensional direction on a support medium, in the form of symbols, numerals or combinations of the symbols and the numerals and a visible image, which comprises:
   (I) a process for obtaining the information in the form of symbols, numerals or combinations of the symbols and the numerals, including:
   (1) determining on each of the plural columns a one dimensional scanning line for signal processing;
   (2) detecting on each of the plural columns sampling points on said scanning line; and
   (3) comparing and identifying said sampling points detected in the plural columns,
   said process being applied to digital signals corresponding to an autoradiograph having the locational information on the groups of radioactively labeled substances, said digital signals being obtained by causing a stimulable phosphor sheet to absorb radiation energy emitted by the groups of radioactively labeled substances on the support medium to record the autoradiograph of the groups of radioactively labeled substances on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically, and
   (II) a process for reproducing the visible image from an electric or digital signal corresponding to said autoradiograph obtained by detecting said stimulated emission photoelectrically.

17. The signal processing method in autoradiography as claimed in claim 16, in which all points on said scanning line at which the signal exhibits maximum levels are assigned to sampling points on the scanning line.

18. The signal processing method in autoradiography as claimed in claim 16 or 17, in which said comparing and identifying of the sampling points are performed by numerical calculation on the positions of sampling points on the scanning lines among the plural rows.

19. The signal processing method in autoradiography as claimed in claim 16 or 17, in which said groups of radioactively labeled substances distributed on the support medium are biopolymers, derivatives of the biopolymers, or cleavage products thereof, labeled with a radioactive element and resolved on the support medium in one dimensional direction.

20. The signal processing method in autoradiography as claimed in claim 19, in which said biopolymers are nucleic acids, derivatives of said nucleic acids or cleavage products of said nucleic acids; and said symbols, numerals and combinations of said symbols and said numerals obtained by said signal processing represents a base sequence of the biopolymers.

21. A signal processing method in autoradiography for determining a base sequence of DNA or DNA fragment, employing at least four groups of base specific cleavage products consisting of:
   (1) base specific cleavage products including at least guanine specific cleavage products;
   (2) base specific cleavage products including at least adenine specific cleavage products;
   (3) base specific cleavage products including at least cytosine specific cleavage products; and
   (4) base specific cleavage products including at least thymine specific cleavage products,
   which are obtained by specific cleavage of the DNA or DNA fragment which has been labeled with a radioactive element, and resolved respectively in a one dimensional direction to form resolved columns on a support medium,
   which comprises:
   (I) a process including:

(1) determining on each of the resolved columns a one dimensional scanning line for signal processing;
(2) detecting one each of the resolved columns sampling points on said scanning line; and
(3) comparing and identifying the positions of said sampling points on the scanning lines among the resolved columns to obtain locational information on quanine, adenine, thymine and cytosine, said process being applied to digital signals corresponding to an autoradiograph having the locational information on the group of radioactively labeled cleavage products, said digital signal being obtained by causing a stimulable phosphor sheet to absorb radiation energy emitted by the group of radioactively labeled cleavage products on the support medium to record the autoradiograph of the group of radioactively labeled cleavage products on the stimulable phosphor sheet, scanning said stimulable phosphor sheet with an electromagnetic wave to release at least a portion of radiation energy stored in said phosphor sheet in the form of the autoradiograph as stimulated emission, and detecting said stimulated emission photoelectrically, and (II) a process for reproducing the visible image from an electric or digital signal corresponding to said autoradiograph obtained by detecting said stimulated emission photoelectrically.

22. The signal processing method in autoradiography as claimed in claim 21, in which said groups of base specific cleavage products of DNA or DNA fragment include at least four groups consisting of:
(1) guanine specific cleavage products;
(2) guanine specific cleavage products and adenine specific cleavage products;
(3) thymine specific cleavage products and cytosine specific cleavage products; and
(4) cytosine specific cleavage products.

* * * * *